United States Patent
Takahashi et al.

(10) Patent No.: US 6,306,494 B1
(45) Date of Patent: Oct. 23, 2001

(54) FINE PARTICULATE SYNTHETIC CHALCOALUMITE COMPOUNDS, PROCESS FOR THEIR PRODUCTION, AND HEAT INSULATOR AND AGRICULTURAL FILM CONTAINING THE FINE PARTICULATE SYNTHETIC CHALCOALUMITE COMPOUNDS

(75) Inventors: Hideo Takahashi, Sakaide; Akira Okada, Takamatsu, both of (JP)

(73) Assignee: Kyowa Chemical Industry Co Ltd, Kagawa-ken (JP)

( * ) Notice: Subject to any disclaimer, the term of this patent is extended or adjusted under 35 U.S.C. 154(b) by 0 days.

(21) Appl. No.: 09/359,739

(22) Filed: Jul. 23, 1999

(30) Foreign Application Priority Data

Jul. 27, 1998 (JP) .................................. 10-225194
May 26, 1999 (JP) .................................. 11-146581

(51) Int. Cl.$^7$ ................................. B32B 5/16; C01F 7/02
(52) U.S. Cl. ..................... 428/328; 428/403; 423/306; 423/308; 423/327.1; 423/395; 423/397; 423/419.1; 423/420.2; 423/430; 423/431; 423/554; 423/556; 423/594; 423/595; 423/596; 423/600; 423/604; 423/625
(58) Field of Search ..................... 428/323, 328, 428/403; 423/306, 308, 327.1, 395, 397, 419.1, 420.2, 430, 431, 463, 493, 495, 519.2, 554, 556, 594, 595, 596, 600, 604, 625

(56) References Cited

U.S. PATENT DOCUMENTS 4,436,833 * 3/1984 Broecker et al. ............. 423/420.2
5,861,133 * 1/1999 Okada et al. ................. 423/306
5,980,856 * 11/1999 Okada et al. ................. 423/600

FOREIGN PATENT DOCUMENTS

844214A1 5/1998 (EP) .
761756A1 10/1999 (EP) .
10 1311 1/1998 (JP) .

* cited by examiner

Primary Examiner—Hoa T. Le (57) ABSTRACT

Novel, fine particulate synthetic chalcoalumite, process for preparation thereof, and a heat insulating agent and agricultural film containing said fine, particulate synthetic chalcoalumite. The above objects are met by synthetic chalcoalumite represented by formula (1) below:

$$(M_1^{2+})_{a-x}(M_2^{2+})_x Al^{3+}_4(OH)_b(A^{n-})_c \cdot mH_2O \quad (1)$$

(in which $M_1^{2+}$ stands for $Zn^{2+}$ or $Cu^{2+}$,
$M_2^{2+}$ is at least one divalent metal ion selected from $Ni^{2+}$, $Co^{2+}$, $Cu^{2+}$, $Zn^{2+}$ and $Mg^{2+}$,
a is $0.3<a<2.0$ (with the proviso that $M_1$ and $M_2$ are not the same),
x is $0 \leq x<1.0$, and $x<a$
b is $10<b<14$,
$A^{n-}$ is at least one selected from $SO_4^{2-}$, $HPO_4^{2-}$, $CO_3^{2-}$, $SO_3^{2-}$, $HPO_3^{2-}$, $NO_3^{-}$, $H_2PO_4^{-}$, $Cl^{-}$, $OH^{-}$ and silicate ion,
c is $0.4<c<2.0$ and
m is 0–4), which has an average secondary particle diameter of not more than about 3 $\mu$m and a BET specific surface area of not more than about 30 m$^2$/g; resin compositions containing the same; and agricultural film composed of said resin compositions.

8 Claims, 2 Drawing Sheets

Comparative Example 15

FINE PARTICULATE SYNTHETIC CHALCOALUMITE COMPOUNDS, PROCESS FOR THEIR PRODUCTION, AND HEAT INSULATOR AND AGRICULTURAL FILM CONTAINING THE FINE PARTICULATE SYNTHETIC CHALCOALUMITE COMPOUNDS

DETAILED DESCRIPTION OF THE INVENTION

Industrially Applicable Field

This invention relates to novel, fine particulate synthetic chalcoalumite compounds, process for their production, and heat insulator and agricultural film containing the fine particulate synthetic chalcoalumite compounds. The invention also relates to inorganic heat insulator which can impart to agricultural film excellent heat insulating property, ultraviolet and visible light transmission, mechanical strength and elongation, agricultural film containing the heat insulator, and processes for production thereof. More specifically, the invention relates to synthetic chalcoalumite compounds having average secondary particle diameter of not more than about 3 μm and BET specific surface area of not more than about 30 m²/g and/or the same synthetic chalcoalumite compounds which are surface treated; resin compositions containing them; and agricultural film provided by processing the resin compositions into film structure.

Prior Art

Agricultural films have been widely used for greenhouse cultivation or tunnel cultivation of agricultural products. Those agricultural films are required to concurrently exhibit transmittance and heat insulating property. That is, temperatures within a greenhouse or tunnel which are raised by the daytime sunbeams rapidly drop in night, in particular, fine weather night, due to radiational cooling. Such rapid temperature drop inside a greenhouse or tunnel incurs adverse effect on growth of crops.

For preventing such rapid temperature drop inside a greenhouse or tunnel, used is heat insulating film formed of a resin in which a material having infrared-absorbing ability, i.e., a heat insulator such as, for example, silica, silicate; hydroxide, oxide, aluminate, borate or sulfate of lithium, calcium, magnesium or aluminum; or a hydrotalcite compound, is blended.

We have earlier discovered that natural chalcoalumite compounds or those synthetic chalcoalumite compounds which are disclosed in Japanese Patent Kokai No. 1311/98 A have refractive indices close to those of thermoplastic resins used for agricultural film in general and exhibit excellent infrared absorbing ability over the broad infrared region of about 2.5–25 μm; and hence are useful as inorganic heat insulators. However, natural chalcoalumite compounds are not uniform in their particle diameters because of their natural origin, have large particle sizes and are difficult of acquisition. Also those synesthetic chalcoalumite compounds disclosed in Kokai 1311/98 A have large average secondary particle diameters and large BET specific surface area. Hence, when those natural or synthetic chalcoalumite compounds are blended in the film, they exhibit very poor dispersibility and develop white blisters, whereby impairing appearance of the film product and reducing its infrared absorbing ability, visible light transmission, mechanical strength and elongation. Thus, the compounds cannot be used as heat insulators for agricultural film.

Problems to be Solved by the Invention

The object of the present invention is to provide a heat insulator which exhibits good dispersibility in thermoplastic resins useful for agricultural film and hence does not form white blisters in film made from said resins, excells in infrared absorbing ability and ultraviolet and visible light transmission, and causes no reduction in mechanical strength and elongation of the film and the film containing said heat insulator.

Means to Solve the Problems

We have engaged in concentrative studies keeping the above problems in mind, to discover that agricultural film free of white blisters and free of reduction in infrared absorbing ability, ultraviolet and visible light transmission, mechanical strength and elongation could be provided by using synthetic chalcoalumite compound represented by the formula (1) below:

$$(M_1^{2+})_{a-x}(M_2^{2+})_x Al^{3+}_4 (OH)_b (A^{n-})_c \cdot mH_2O \qquad (1)$$

(in which $M_1^{2+}$ stands for $Zn^{2+}$ or $Cu^{2+}$,
$M_2^{2+}$ is at least one of divalent metal ion selected from $Ni^{2+}$, $Co^{2+}$, $Cu^{2+}$, $Zn^{2+}$ and $Mg^{2+}$,
a is $0.3 < a < 2.0$ (provided $M_1$ and $M_2$ are not the same),
x is $0 \leq x < 1.0$, and $x < a$,
b is $10 < b < 14$,
$A^{n-}$ is at least one selected from $SO_4^{2-}$, $HPO_4^{2-}$, $CO_3^{2-}$, $SO_3^{2-}$, $HPO_3^{2-}$, $NO_3^-$, $H_2PO_4^-$, $Cl^-$, $OH^-$ and silicate ion,
c is $0.4 < c < 2.0$ and
m is 0–4),
which has an average secondary particle diameter of not more than about 3 μm and a BET specific surface area of not more than about 30 m²/g; and/or the same synthetic chalcoalumite compound which has been surface treated, as the heat insulator in said agricultural film.

Such synthetic chalcoalumite compound having an average secondary particle diameter not more than about 3 μm and BET specific surface area of not more than about 30 m²/g can be prepared by a process comprising coprecipitating a water-soluble aluminium salt; a Zn and/or Cu compound which is water-soluble in the pH range of from about 4 to about 7, and if necessary one or more compounds of at least an element selected from Ni, Co and Mg which are water-soluble in the pH range of from about 4 to about 7, at a pH of from about 4 to about 7 and a temperature within a range of from about 10 to about 50° C.; filtering the coprecipitate, washing it with water and subjecting the so washed product to hydrothermal reaction in an aqueous solution of sulfuric acid salt of at least one element selected from Zn, Cu, Ni and Co at a concentration of at least 0.02 mol/liter, at temperatures ranging from about 80 to 170° C.

Embodiments of the Invention

This invention relates to synthetic chalcoalumite compounds having an average secondary particle diameter of not more than about 3 μm and BET specific surface area of not more than about 30 m²/g, which are represented by the formula (1) and can be prepared by the following process.

The process comprises the steps of coprecipitating a water-soluble aluminium salt; a Zn and/or Cu compound which is water-soluble in the pH range of from about 4 to about 7; and if necessary one or more compounds of at least an element selected from Ni, Co and Mg which are water-soluble in the pH range of from about 4 to about 7, at a pH of from about 4 to about 7 and at temperatures ranging from about 10° to 50° C., preferably from about 20 to 40° C.; filtering the coprecipitate and washing it with water; and then subjecting the washed product to hydrothermal reaction in an aqueous solution of sulfuric acid salt of at least one element selected from Zn, Ni, Cu and Co at a concentration of at least 0.02 mol/liter, preferably ranging from about 0.02 to 1 mol/liter, inter alia, from about 0.05 to 0.5 mol/liter, at temperatures ranging from about 80° to 170° C., preferably from about 100° to 150° C.

The characteristic feature of the synthesizing process of this invention lies in subjecting the coprecipitate obtained through the coprecipitation reaction which is recovered by filtration and washed with water, to the hydrothermal reaction in an aqueous solution of a sulfuric acid salt of at least an element selected from Zn, Cu, Ni and Co at a concentration of at least about 0.02 mol/liter, preferably about 0.02–1 mol/liter, inter alia about 0.05–0.5 mol/liter. When this method is used, the intended fine particulate, highly dispersible synthetic chalcoalumite compounds can be obtained because nearly no unnecessary ion is present at the time of crystal growth in the hydrothermal reaction.

Examples of starting materials for preparing the synthetic chalcoalumite compounds of the invention; i.e., water-soluble aluminium salt and Zn, Cu, Ni, Co and Mg compounds which are water-soluble in the pH range of from about 4 to 7 include:

aluminium compounds such as aluminium chloride, aluminium sulfate, aluminium nitrate and sodium aluminate;

zinc compounds such as zinc chloride, zinc nitrate, zinc sulfate, zinc acetate and zinc oxide;

copper compounds such as copper chloride, copper sulfate, copper nitrate and copper acetate;

nickel compounds such as nickel chloride, nickel sulfate, nickel nitrate and nickel acetate;

cobalt compounds such as cobalt chloride, cobalt sulfate, cobalt nitrate and cobalt acetate; and magnesium compounds such as magnesium chloride, magnesium sulfate, magnesium nitrate and magnesium acetate, and furthermore magnesium oxide and hydroxide.

Crystalline chalcoalumite compound is formed when the coprecipitation reaction is conducted at an atomic ratio of the divalent metal ions $[(M_1^{2+})_{a-x}(M_2^{2+})_x]$ referring to the formula (1)] to trivalent aluminium ion $Al^{3+}$, $((M_1^{2+})_{a-x}(M_2^{2+})_x/Al^{3+}$, within a range of 0.075–0.50. In particular, when the reaction is conducted at the atomic ratio in the range of 0.15–0.37, chalcoalumite of very favorable crystalline growth is formed.

Examples of alkali compound to be used for adjusting pH of the coprecipitation reaction system to from about 4 to about 7 include sodium hydroxide, potassium hydroxide, sodium carbonate, potassium carbonate, aqueous ammonia, ammonia gas, magnesium oxide, magnesium hydroxide, basic magnesium carbonate, zinc oxide, calcium hydroxide and the like. These alkali compounds are normally used in an amount of 0.90–1.1 equivalents to the sum of the divalent metal ions and Al ions.

For obtaining a synthetic chalcoalumite compound of the present invention having an average secondary particle diameter of not more than about 3 μm and a BET specific surface area of not more than 30 m²/g, it is necessary to subject the coprecipitate formed upon the reaction, which has a composition following within the range specified by the formula (1), at a pH of from about 4–7 and then recovered by filtration and washed with water, to a hydrothermal reaction in an aqueous solution of one or more sulfuric acid salts of at least one element selected from Zn, Ni, Cu and Co at a concentration of at least 0.02 mol/liter, preferably 0.02–1 mol/liter, inter alia 0.05–0.5 mol/liter, at temperatures in the range of about 80–170° C., preferably about 100–150° C. At the sulfuric acid salt concentration less than 0.02 mol/liter or in aqueous solution of a salt other than sulfate, such as chloride, nitrate or acetate, the fine particulate synthetic chalcoalumite compounds of high dispersibility having an average secondary particle diameter of not more than about 3 μm and a BET specific surface area of not more than 30 m²/g as intended by the present invention cannot be obtained.

Furthermore, when production of such chalcoalumite compounds of formula (1) in which the anion ($A^{n-}$) is not $SO_4^{2-}$ or consists not exclusively of $SO_4^{2-}$ but contains another anion is intended, it can be readily accomplished by first preparing a synthetic chalcoalumite compound of the formula (1) in which all anions ($A^{n-}$) are $SO_4^{2-}$, having an average secondary particle diameter of not more than about 3 μm and a BET specific surface area of not more than about 30 m²/g, and then substituting all or a part of the $SO_4^{2-}$ by an anion selected from $HPO_4^{2-}$, $CO_3^{2-}$, $SO_3^{2-}$, $HPO_3^{2-}$, $NO_3^-$, $H_2PO_4^-$, $Cl^-$, $OH^-$ and silicate ions. As silicate ions, for example, $SiO_3^{2-}$, $SiO_4^{4-}$, $Si_2O_5^{2-}$, $Si_2O_7^{6-}$, $Si_3O_5^{4-}$ and $Si_4O_{11}^{6-}$ may be named, while there are many of those having different degrees of polymerization of silicic acid. The substitution reaction is conducted by adding the chalcoalumite compound of the formula (1) in which ($A^{n-}$) is $SO_4^{2-}$ to an aqueous solution of salt of one of these anions, alkali metal hydroxide or the like at temperatures in the range of about 20–80° C., followed by agitation for several minutes to about an hour. In this case, the amount of the salt of anion or alkali metal hydroxide is such that the equivalent number of said anion to Al atoms in the formula (1) is 0.5 to 1.0.

The synthetic chalcoalumite compounds having the composition of formula (1) can be identified by means of compositional analysis and powder X-ray diffraction (XRD) method. Based on JCPDS (Joint Committee On Powder Diffraction Standards) card, main four lattice spacings (dÅ) are shown in Table 1 below.

TABLE 1

| Chalcoalumite compound | JCPDS Card No. | Lattice spacing [d(Å)] | Chemical formula |
|---|---|---|---|
| Chalcoalumite | 25–1430 | 8.50x, 4.25₉ 4.18₃, 7.90₂ | $CuAl_4SO_4(OH)_{12} \cdot 3H_2O$ |
| Chalcoalumite | 8–142 | 8.92x, 8.29x 4.24x, 4.36₉ | $CuAl_4SO_4(OH)_{12} \cdot 3H_2O$ |

TABLE 1-continued

| Chalcoalumite compound | JCPDS Card No. | Lattice spacing [d(Å)] | Chemical formula |
|---|---|---|---|
| Mbobomkulite | 35–696 | $8.55x, 4.27_4$ $7.87_2, 4.55_2$ | $(Ni, Cu)Al_4[(NO_3)_2(SO_4)](OH)_{12}.3H_2O$ |
| Nickelalumite | 35–698 | $8.54x, 4.27x$ $7.88_2, 2.00_2$ | $(Ni, Cu)Al_4[(NO_3)(SO_4)](OH)_{12}.3H_2O$ |

Each of the products obtained by the production process of the present invention as in the later-appearing working examples was given a powder X-ray diffraction analysis and was identified to be a chalcoalumite compound by collating the lattice spacing between diffraction sites in the resulting diffraction chart with those on JCPDS card.

The synthetic chalcoalumite compounds of the invention form superlattice structure based on $Al(OH)_3$ (gibbsite) structure and a diffraction line corresponding to the lattice plane (300) of the compound is detected in the vicinity of $2\theta(Cu\ K_\alpha\text{-ray})=62.4$ to $62.6°$ by the XRD method. This is a diffraction line based on the regular configuration of the Al atom of the above gibbsite structure.

The synthetic chalcoalumite compounds of the present invention have an average secondary particle diameter of not more than about 3 μm and BET specific surface area of not more than about 30 m²/g, and exhibit good dispersibility when blended into the resins as they are. Whereas, with the view to further improve their compatibility with the resins and processability, they may be surface-treated with at least one member of the group consisting of higher fatty acids; anionic surfactants; phosphoric acid esters; silane-, titanate- and aluminum-containing coupling agents; and fatty acid esters of polyhydric alcohols.

Specific examples of preferred surface-treating agents are as follows: higher fatty acids such as stearic acid, oleic acid, erucic acid, palmitic acid and lauric acid and alkali metal salts of these higher fatty acids; anionic surfactants such as sulfate esters of higher alcohols, eg., stearyl alcohol and oleyl alcohol, sulfate ester salts of polyethylene glycol ethers, amide bond sulfate ester salts, ether bond sulfonate salts, ester bond sulfonates, amide bond alkylallylsulfonate salts and ether bond alkylallylsulfonate salts; phosphoric acid esters such as acid or alkali metal salts or amine salts, which are mono- or diesters between orthophosphoric acid and oleyl alcohol, stearyl alcohol or the like, or mixtures of these esters; silane coupling agents such as vinylethoxysilane, γ-methacryloxypropyltrimethoxysilane vinyl-tris(2-methoxyethoxy)silane and γ-aminopropyltrimethoxysilane; titanate coupling agents such as isopropyl triisostearoyl titanate, isopropyl tris (dioctylpyrophosphate) titanate and isopropyl tridecylbenzenesulfonyl titanate; and aluminum coupling agents such as acetalkoxyaluminum diisopropylate, etc.

As methods of the surface treatment, there are wet method and dry method. In the wet method, a surface-treating agent as named above in liquid or emulsion state is added to slurry of the synthetic chalcoalumite compound, and sufficiently mixed under stirring at a temperature up to about 100° C. In the dry method, powder of the synthetic chalcoalumite compound is put in a mixer such as a Henschel mixer, to which the surface-treating agent in liquid, emulsion or solid state is added and sufficiently mixed with or without heating. Preferably, the surface-treating agent is used in an amount of about 0.1 to about 15% by weight of the synthetic chalcoalumite compound.

As examples of thermoplastic resins which are used for agricultural film according to the invention, polyolefin resins, chlorine-containing resins, polyester resins, acrylic resins and fluorine-containing resins can be named. Specific examples of the polyolefin resins include homopolymers of α-olefins such as low-density, high-density or straight chain polyethylene and polypropylene; α-olefin copolymers such as ethylene-propylene copolymers, ethylene-butene-1 copolymers, ethylene-4-methyl-1-pentene copolymers, ethylene-hexene copolymers and ethylene-octene copolymers; and copolymers of α-olefins with monomers other than α-olefins, whose main component is the α-olefins, such as ethylene-vinyl acetate copolymers, ethylene-acrylate copolymers, ethylene-methyl methacrylate copolymers, ethylene-vinyl acetate-methyl methacrylate copolymers and ionomer resins. As the catalyst to be used in synthesizing these polyolefinic resins, for example, Ziegler-Natta-type catalyst, Cr-containing catalyst and singlesite (metallocene) type catalyst may be named. Their synthesis method is not critical, but any of solution methods or vapor phase methods under high pressure, reduced pressure or normal pressure may be used. Examples of chlorine-containing resins include polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-styrene copolymers, vinyl chloride-isobutylene copolymers, vinyl chloride-butadiene copolymers, vinyl chloride-isoprene copolymers, vinyl chloride-chlorinated propylene copolymers, vinyl chloride-maleate copolymers, vinyl chloride-methacrylate copolymers, vinyl chloride-acrylonitrile copolymers, vinyl chloride-styrene-maleic anhydride copolymers, vinyl chloride-styrene-acrylonitrile copolymers, vinyl chloride-vinylidene chloride-vinyl acetate copolymers and vinyl chloride-various vinyl ether copolymers. Examples of polyester resins include polyethylene terephthalate, bulybutylene terephthalate, polybutylene naphthalate and polyether polyesters; and those of fluorine-containing resins include polytetrafluoroethylene and the like. Those resins can be used either singly or as a mixture of two or more of them.

The agricultural film according to the present invention may furthermore contain various additives customary in this technology. Examples of such additives include light stabilizer, anti-hazing agent, antifogging agent, antioxidant, ultraviolet absorber, plasticizing agent, antistatic agent, lubricant, heat stabilizer, fluorescent agent, antiblocking agent, pigment, dyestuff, antibacterial agent, antimolding agent, parting agent, plate out-preventing agent and processing aids. They may be concurrently used with other infrared absorbing agent. By the concurrent use of these various additives, agricultural film excelling in weatherability, anti-haze property, antifogging property, dust resistance, water repellence, toughness, resistance to agricultural chemicals and to acid precipitation, heat resistance, antibleaching property, antibacterial and antifungicidal properties, stretching processability and resistance of degradation of the resins caused by various additives, as well as in durability of those favorable properties is obtained.

As the light stabilizers, for example, hindered amine compounds, cresols, melamines and benzoic acid may be named, hindered amine compounds being frequently used in general. More specifically, 2,2,6,6-tetraalkylpiperidine derivatives having a molecular weight not less than 250 and a substituent on 4-position are preferably used, examples of said 4-substituent including carboxylic acid groups, alkoxy groups and alkylamino groups. Their N-position may be substituted with an alkyl group. As specific examples of such hindered amine compounds, compounds of formulae (a)–(t) below and hindered amine-containing stabilizers such as Ciba Geigy's TINUVIN 492 and 494 may be named.

R:

(a)

(b)

(c)

(d)

(e)

(f)

(g)

(h)

(i)

(j)

(k)

(l)

(m)

(n)

(o)

(p)

(q)

(r)

(s)

(t)

Such light stabilizers as above may be used singly or in combination of more than one, the amount of use being 0.02–5% by weight, preferably 0.1–2% by weight, to the thermoplastic resin.

As antihazing agent, nonionic, anionic or cationic surfactants may be used, examples of which including polyoxyalkylene ethers, esters or partial esters of polyhydric alcohols, esters or partial esters of alkylene oxide adducts of polyhydric alcohols, higher alcohol sulfuric acid ester alkali metal salts, alkylarylsulfonates, quaternary ammonium salts and aliphatic amine derivatives. Specifically, polyoxyethylene laurate, polyoxyethylene stearyl ether, polyoxyethylene nonyl phenyl ether, polyethylene glycol monopalmitate, polyethylene glycol monostearate, polyoxyethylene sorbitan monolaurate, polyoxyethylene sorbitan monopalmitate; esters or partial esters of polyhydric alcohols such as glycerine, pentaerythritol, sorbitol, diglycerine and triglycerine with aliphatic carboxylic acids such as lauric acid, palmitic acid, stearic acid and oleic acid; sodium lauryl sulfate, sodium dodecylbenzenesulfonate, sodium butylnaphthalenesulfonate, cetyltrimethylammonium chloride, alkyldimethylbenzylammonium chloride, dodecylamine hydrochloride, lauric acid laurylamidoethyl phosphate, triethylcetylammonium iodide, oleylaminodiethyl aminate and basic pyridinium salt of dodecylpyridinium sulfate may be named. Use rate of such anti-hazing agent is 0.2–5% by weight, preferably 0.5–3% by weight, to the thermoplastic resin. Those antihazing agents as named above can be used either singly or in combination of two or more.

As antifogging agent, for example, fluorine compounds containing perfluoroalkyl groups or ω-hydrofluoroalkyl groups (fluorine-containing surfactants) and silicon compounds having alkylsiloxane groups (silicon-containing surfactants) may be used. Use rate of such antifogging agent is 0.01–5% by weight, preferably 0.02–2% by weight, to the thermoplastic resin. Those antifogging agents as named above can be used either singly or in combination of two or more.

As antioxidant, phenol-, phosphorus-, sulfur- or hydroxyamine-containing antioxidants can be used. Those piperidine-containing compounds as named among the useful light stabilizers can also be used. Specific examples of phenolic antioxidants include phenols such as 2,6-di-tert-butyl-p-cresol, stearyl-(3,5-dimethyl-4-hydroxybenzyl) thioglycolate, stearyl-β-(4-hydroxy-3,5-di-tert-butylphenyl) propionate, distearyl-3,5-di-tert-butyl-4-hydroxybenzylphosfonate, 2,4,6-tris(3',5'-di-tert-butyl-4'-hydroxybenzylthio)-1,3,5-triazine, distearyl(4-hydroxy-3-methyl-5-tert-butyl)benzylmalonate, 2,2'-methylene-bis(4-methyl-6-tert-butylphenol), 4,4'-methylenebis(2,6-di-tert-butylphenol), 2,2'-methylene-bis[6-(1-methylcyclohexyl)p-cresol], bis[3,5-bis(4-hydroxy-3-tert-butylphenyl)butyric acid] glycol ester, 4,4'-butylidenebis(6-tert-butyl-m-cresol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl) phenyl]terephthalate, 1,3,5-tris(2,6-dimethyl-3-hydroxy-4-tert-butyl)benzylisocyanurate, 1,3, 5-tris(3,5-di-tert-butyl-4-hydroxybenzyl)-2, 4,6-trimethylbenzene, 2,6-diphenyl-4- octadecyloxyphenol, tetraquis-[methylene-3-(3,5-de-tert-butyl-4-hydroxyphenyl)propionate]-methane, 1,3,5-tris-(3,5-di-tert-butyl-4-hydroxybenzyl)isocyanurate, 1,3,5-tris[(3,5-di-tert-butyl-4-hydroxyphenyl)propionyloxyethyl]-isocyanurate, 2-octyl-4,6-di(4-hydroxy-3,5-di-tert-butyl) phenoxy-1,3,5-triazine and 4,4'-thiobis(6-tert-butyl-m-cresol; and polyhydric phenol-carbonic acid oligoesters such as carbonic acid oligoesters of 4,4'-butylidenebis(2-tert-butyl-5-methylphenol) (eg., those of polymerization degrees of 2, 3, 4, 5, 6, 7, 8, 9 and 10).

Specific examples of phosphorus-containing antioxidants include triaryl phosphites such as triphenyl phosphite, tris (nonylphenyl) phosphite, tris(p-nonylphenyl)phosphite, tris(p phenylphenyl)phosphite, tris(o-dicyclohexylphenyl) phosphite, tri(monononyl/di-nonyl-phenyl)phosphite, phenyl-p-nonylphenyl phosphite, tris(2,4-di-tert-butylphenyl)phosphite and tris[2-tert-butyl-4-(3-tert-butyl-4-hydroxy-5-methylphenylthio)5-methylphenyl]phosphite; alkylaryl phosphites such as mono-octyldi-phenylphosphite, di-octylmonophenylphosphite, di-decyl-monophenylphosphite and monodecyl-phenylphenylphosphite; trialkyl phosphites such as tributyl phosphite, trioctyl phosphite, tridecyl phosphite, trilauryl phosphite and trioleyl phosphite; and organophosphoric antioxidants and metal salt compounds of organophosphoric acid containing alkyl, aryl or alkylaryl groups or ester linkages, such as di(tridecyl)-pentaerythritol diphosphite, distearyl-pentaerythritol diphosphite, di(nonylphenyl) pentaerythriol diphosphite, bis(2,4-di-tert-butylphenyl)-pentaerythritol diphosphite, bis(2,6-di-tert-butyl-4-methylphenyl)-pentaerythritol diphosphite, tetra(tridecyl) isopropylidenediphenol diphosphite, hexa(tridecyl)-1,1,3-tris(2-methyl-4-hydroxy-5-tert-butylphenyl)butane triphosphite, tetraquis(2,4-di-tert-butylphenyl)-biphenylene diphosphonite and 2,2'-methylenebis(4,6-di-tert-butylgphenyl) (octyl)phosphite.

Examples of sulfur-containing antioxidants include dialkylthiodipropionates such as dilauryl- and distearly-thiodi-propionates and esters of alkylthiopropionic acids (such as butyl-, octyl-, lauryl- and stearyl-) and polyhydric alcohols (such as glycerine, trimethylolethane, trimethylolpropane, pentaerythritol, trishydroxyethyl isocyanurate). As specific examples, dilaurylthiodipropionate, distearylthiodipropionate and pentaerythritol tetralaurylthiopropionate may be named.

The use rate of such antioxidant is 0.01–5% by weight, preferably 0.02–3% by weight, to the thermoplastic resin. These antioxidants can be used either singly or in combination of more than one.

Ultraviolet absorbing agents may be benzotriazole-, benzophenone- or salicylate-type. Specific examples of benzotriazole ultraviolet absorbers include 2-(2'-hydroxy-5'-methylphenyl)-benzotriazole, 2-(2'-hydroxy-5'-tert-butylphenyl)benzotriazole, 2-(2'-hydroxy-3',5'-dimethylphenyl)benzotriazole, 2-(2'-methyl-4'-hydroxyphenyl)benzotriazole, 2-(2'-hydroxy-3'-methyl-5'-tert-butylpheny)-benzotriazole, (2'-hydroxy-3',5'-di-tert-alumiphenyl)benzotriazole, (2'-hydroxy-3',5'-di-tert-butylphenyl)benzotriazole, 2-(2'-hydroxy-3',5'-dimethylphenyl-5-methoxybenzotriazole, 2-(2'-n-octa-decyloxy-3',5'-dimethylphenyl)-5-methylbenzotriazole, 2-(2'-hydroxy-5'-methoxyphenyl)benzotriazole, 2-(2'-hydroxy-4'-octoxyphenyl)benzotriazole, 2-(2'-hidorxy-5'-methoxyphenyl)-5-methylbenzotriazole, 2-(2'-hydroxy-5'-methoxyphenyl)-5,6-dichlorobenzotriazole, 2-(2'-hydroxy-5'-tert-butylphenyl)-5-chlorobenzotriazole, 2-(2'-hydroxy-3',5'-di-tert-butylphenyl)-5-chlorobenzotriazole, 2-(2'-hydroxy-5'-phenylphenyl)-5-chlorobenzotriazole, 2-(2'-hydroxy-5'-dichlorohexylphenyl)benzotriazole, 2-(2'-hydroxy-4',5'-dichlorophenyl)benzotriazole, 2-(2'-hydroxy-3',5'-di-tert-butylphenyl)-5-chlorobenzotriazole, 2-(2'-hydroxy-3'-tert-butyl-5 '-methylphenyl)-5-chlorobenzotriazole, 2-(2'-hydroxy-3'-methylphenyl)-5-butoxycarbonylbenzotriazole, 2-(2'-hydroxy-4',5'-dimethylphenyl)-5-butoxycarbonylbenzotriazole, 2-(2'-hydroxy)-5-ethoxycarbonylbenzotriazole, 2-(2'-acetoxy-5'-methylphenyl)-benzotriazole, 2-(2'-hydroxy-5'-methylphenyl)-5-ethylsulfobenzotriazole, 2-(2'-hydroxy-3',5'-dimethylphenyl)-5-ethylsulfonbenzotriazole, 2-(2'-hydroxy-5'-phenylphenyl)benzotriazole and 2-(2'-hydroxy-5'-aminophenyl)benzotriazole.

Specific examples of benzophenone ultraviolet absorbers include 2-hydroxy-4-methoxybenzophenone, 2-hydroxy-4-n-octyloxybenzophenone, 2-hydroxy-4-octoxybenzophenone, 2-hydroxy-4-n-dodecyloxybenzophenone, 2-hydroxy-4-n-octadecyloxybenzophenone, 2-hydroxy-4-benzyloxybenzophenone, 2-hydroxy-4-methoxy-2'-carboxybenzophenone, 2-hydroxy-4-methoxy-5-sulfobenzophenone, 2-hydroxy-5-chlorobenzophenone, 2,4-dihydroxybenzophenone, 2,2'-dihydroxy-4-methoxybenzophenone, 2,2'-dihydroxy-4,4'-dimethoxybenzophenone, 2,2'-dihydroxy-4,4'-dimethoxy-5-sulfobenzophenone and 2,2,4,4'-tetrahydroxybenzophenone.

Specific examples of salicylate ultraviolet absorbers include phenyl salicylate, p-tert-butylphenyl salicylate, p-methylphenyl salicylate and p-octylphenyl salicylate.

Besides the foregoing, triazine-type 2-(4,6-diphenyl-1,3,5-triazin-2-yl)-5-[(hexyl)oxy]phenol or oxalic acid anilide type 2-ethoxy-2'-ethyl-oxalic acid bisanilide may also be named.

The use rate of such ultraviolet absorbers is 0.01–3% by weight, preferably 0.05–2% by weight, to the thermoplastic resin. The absorbers can be used either singly or in combination of two ro more.

As plasticizers, those routinely used for plasticizing polyvinyl chloride or olefin-vinyl alcohol copolymers can be used. For example, low molecular weight polyhydric alcohols, phthalic acid esters, phosphoric acid esters, aliphatic-basic acid esters, epoxy compounds and paraffins can be used.

Specific examples of the low molecular weight polyhydric alcohols include glycerine, ethylene glycol, triethylene glycol and sorbitol.

Specific examples of phthalic acid ester plasticizers include dimethyl phthalate, dibutyl phthalate, dioctyl phthalate, diisodecyl phthalate, heptyl phthalate, di-2-ethylhexyl phthalate, butylbenzyl phthalate, butyllauryl phthalate and methyloleyl phthalate.

Specific examples of phosphoric acid ester plasticizers include tricresyl phosphate, trixylenyl phosphate, dixylenyl monocresyl phosphate, monoxylenyl cresyl phosphate, tributyl phosphate, triphenyl phosphate and tri-2-ethylhexyl phosphate.

Specific examples of aliphatic-basic acid ester plasticizers include butyl oleate, glycerine monooleate, butyl stearate, diisodecyl adipate, dibutyl adipate, dioctyl adipate, isodecyl adipate, dioctyl azelate, di-2-ethylhexyl adipate and methyl acetyl ricinoleate.

Specific examples of the epoxy compounds are similar to those exemplified as epoxy heat stabilizers later.

Specific examples of paraffinic plasticizers include chlorinated paraffins, butylchlorinated paraffins and liquid paraffin.

Use rate of such plasticizers as above ranges 1–70% by weight, preferably 2–60% by weight, to the thermoplastic resin. They can be used either singly or in combination of two or more.

As useful antistatic agents, nonionic or cationic surfactants may be named. Specific examples include polyethylene oxide, carbowax, pentaerythritol monostearate, sorbitol monopalmitate, polyoxyethylene alkylamine, polyglycol ether and sodium p-styrene-sulfonate.

Such antistatic agents are added in an amount of 0.01–5% by weight, preferably 0.02–3% by weight, to the thermoplastic resin. They can be used either singly or in combination of two or more.

As useful lubricants, aliphatic acid-, aliphatic acid amide- and ester-type lubricants, waxes and paraffins can be named. Specific examples include stearic acid, palmitic acid, myristic acid, stearic acid amide, palmitic acid amide, erucic acid amide, methyl-enebis-stearamide, ethylenebis-stearamide, butyl stearate, butyl palmitate, polyethylene wax and liquid paraffin.

Use rate of such lubricants ranges 0.01–5% by weight, preferably 0.05–3% by weight, to the thermoplastic resin. They can be used either singly or in combination of two or more.

As heat stabilizers, inorganic, organic acid metal salt-, organic acid complex metal salt-, organo-tin-, epoxy compound-, olyol-, sulfur-, organic antimony-, phosphite- and β-diketone-type or itrogen-containing heat stabilizers can be used.

Specific examples of inorganic heat stabilizers include oxides, hydroxides, carbonates, sulfates, phophates, phosphites and silicates of such metals as Li, Na, K, Mg, Ca, Sr, Ba, Pb, Zn, Cd, Zr, Al, Sn, Sb and Bi; and salts of these metals with halogenated oxyacids such as perchloric acid, periodic acid, chloric acid, bromic acid, iodic acid, chlorous acid, hypochlorous acid and bromous acid.

As organic metal salt-type heat stabilizers, acidic, neutral or basic salts of above-named metals with the below-exemplified organic acids can be named: aliphatic carboxylic acids such as 2-ethylhexonic acid, lauric acids, myristic acid, palmitic acid, stearic acid, hydroxystearic acid, linoleic acid, behenic acid, isostearic acid, oleic acid, ricinoleic acid, caproic acid, heptanoic acid, n- or iso-octylic acid, pelargonic acid, capric acid, isodecanoic acid, undecylic acid, neotridecanoic acid, acetoacetic acid and acetic acid; dibasic acids such as maleic acid, neodipropionic acid and dithiopropionic acid; partially esterified products of those dibasic acids with substituted or unsubstituted aliphatic, alicyclic or aromatic alcohols; and cyclic organic acids such as benzoic acid, methylbenzoic acid, butylbenzoic acid, para-t-butylbenzoic acid, phenylacetic acid, salicylic acid, fumaric acid, naphthoic acid, abietic acid, phenylstearic acid, hydrinecarboxylic acid, cinnamic acid, rhodinic acid and haphthenic acid.

Specific examples of organic complex metal salt-type heat stabilizers include Ca/Zn, Ba/Cd, Ba/Zn and Ba/Cd/Zn salt systems of above organic acids.

Specific examples of organotin heat stabilizers include mono(or di)methyl- or butyl- or octyl-tintri-(or di)laurate, mono(or di)methyl- or butyl- or octyl-tin maleate polymer, mono(or di)methyl-, or butyl- or octyl-tintris(or bis)isooctyl maleate, mono(or di)methyl- or butyl- or octyl-tin thioglycolate, mono(or di)methyl or butyl or octyl-tin-2-mercaptopropionate, mono(or di)methyl or butyl- or octyl-tintri(or di)dodecylmercaptide, mono(or di)methyl- or butyl- or octyl-tin sulfide, mono(or di)methyl- or butyl- or octyl-tin-thioglycolate, mono(or di)methyl- or butyl- or octyl-tin-tris(or bis)2-mercaptoethyl oleate, thiobis(mono-methyltin-bis-2-mercaptoethyl oleate) and thiobis(dimethyl- or butyl- or octyl-tin-mono-2-mercaptoethyl oleate).

Specific examples of epoxy compound-type heat stabilizers include epoxylated soybean oil, diacetomonoglycelide thereof, epoxylated linseed oil, epoxylated linseed oil fatty acid butyl, epoxylated 1,2-polybutadiene, bisphenol-A-diglycidyl ether, 3,4-epoxycyclohexylmethyl, 3,4-epoxycyclohexanecarboxylate, epoxylated tallow oil, epoxylated cottonseed oil, epoxylated sunflower oil, epoxylated tall oil, epoxylated fish oil, epoxylated aceto-monoolefin, epoxylated stearic acid methyl-, -butyl, -isooctyl, -2-ethylhexyl, -isodecyl, -cyclohexyl, -dihydrononyl, -methyoxyethyl, -acetoxyethyl, -benzoyl, -tetrahydrofuryl, -phenyl or -p-tert-butylphenyl, epoxylated tall oil fatty acid-butyl, -n-octyl, -isooctyl or -2-ethylhexyl, epoxytriacetomonoricinoleic acid glyceride, 9,10-epoxystearic acid ester of 3,4-epoxycyclohexylmethanol, 9,10,12,13-diepoxystearic acid ester of 3,4-epoxycyclohexylmethanol, 2-ethyl-1,3-hexanediol ester of 3,4-epoxycyclohexylcarboxylic acid, dialkyl (eg., di-n-butyl, di-n-hexyl, di-2-ethylhexyl, diisooctyl, di-n-decyl, diisodecyl, di-n-butyldecyl and the like) esters of epoxy-hexahydrophthalic acid, 3,4-epoxy-6-methylcyclohexyl carboxylate, bis(3,4-epoxy-6-methylcyclohexylmethyl)-adipate and condensation product of epihalohydrin and bisphenol A.

Specific examples of polyol-type heat stabilizers include pentaerythritol, mannitol, xylitol, sorbitol, glycerine, trimethylolpropane, polyethylene glycol, polyvinyl alcohol, 1,3-butanediol, propylene glycol, dipropylene glycol, ethylene glycol, diethylene glycol, neopentyl glycol, triethylolmethane, diglycerine, di-tri-methylolpropane, di-tri-methylol ethane, di-, tri- or tetra-penta-erythritol, tris (hydroxyethyl)isocyanurate; and partial esters of these polyols with such organic acids as aliphatic carboxylic acids, aromatic carboxylic acids, amino acids and oxyacids. Specific examples of the organic acids which form the partial esters include monovalent aliphatic carboxylic acids such as octylic acid, lauric acid, myristic acid, palmitic acid, stearic acid, isostearic acid, hydroxystearic acid, oleic acid and ricinoleic acid; divalent aliphatic carboxylic acids such as malonic acid, succinic acid, glutaric acid, adipic acid, pimelic acid, suberic acid, azelaic acid, sebacic acid, phthalic acid, maleic acid, fumaric acid, itaconic acid, thiodipropionic acid and dithiopropionic acid; aromatic acids such as benzoic acid, methylbenzoic acid and salicylic acid; amino acids such as glycine, alanine, leucine, phenylalanine, methionine, aspartic acid, glutamic acid and lysine; and oxy acids such as lactic acid, citric acid, tartaric acid and malic acid.

Specific examples of sulfur-type heat stabilizers include thiodipropionic acid esters such as dilaurylthiodipropionate, distearylthiodipropionate and laurylstearylthiodipropionate; triazinethiols such as 6-enilino-1,3,5-triazine-2,4-dithiol; and thiolcarboxylic anhydride such as thiollauric anhydride.

Specific examples of organic antimony-type heat stabilizers include mono(or di)alkylantimony laurates such as mono(or di)methyl-, butyl- or octyl-antimony tri(or di)laurate; mono(or di)-alkyl antimony maleates such as mono(or di)methyl-, butyl- or octyl-antimony maleate polymers and mono(or di)methyl-, butyl- or octyl-antimony tris(or bis)isooctyl maleate; and mono(or di)alkylantimony mercaptides such as mono(or di)methyl-, butyl- or octyl-antimony-tris (or bis)isooctylthioglycolate, mono(or di)methyl-, butyl- or octyl-antimony-tri (or bis)thioglycolate (or 2-mercaptopropionate), mono(or di)methyl-, butyl- or octyl-antimony-tri(or di)dodecylmercaptide, mono(or di)methylantimony sulfide, dioctylantimony sulfide, didodecylantimony sulfide, mono(or di)methyl-, butyl- or octylanti-mony-tris (or bis)-2-mercaptoethyl oleate, thiobis [monomethylantimony-bis(2-mercaptoethyl oleate)] and thiobis[dimethyl-, butyl- or octyl-antimony-bis(2-mercaptoethyl oleate)].

As phosphite-type heat stabilizers, those exemplified as phosphorus antioxidants can be similarly used.

Specific examples of β-diketone heat stabilizers include ethyl acetoacetate, dehydroacetic acid, acetylacetone, benzoylacetone, benzoylpropionylmethane, dibenzoylmethane, stearoylbenzoylmethane, trifluoroacetylacetone, dehydropropionylacetic acid, dehydrobenzoylacetic acid, cyclohexane-1,3-dione, dimethone, 2,2-methylenecyclohexan-1,3-dione, 2-benzylcyclohexan-1, 3-dione, acetyltetralone, palmitoyltetralone, stearoyltetralone, benzoyltatralone, 2-acetylcyclohexanone, 2-benzoylcyclohexanone, 2-acetyl-cyclohexan-1,3-dione, benzoyl-p-chlorobenzoylmethane, bis(4-methyl-benzoyl) methane, bis(2-hydroxybenzyol)methane, benzoylacetylmethane, tribenzoylmethane, diacetylbenzoylmethane, palmitoylbenzoylmethane, lauroylbenzoylmethane, 4-methoxybenzoylbenzoylmethane, bis(4-methoxybenzoyl) methane, bis(4-chlorobenzoyl)-methane, bis(3,4-methylenedioxybenzoyl)methane, benzoylacetyloctylmethane, benzoylacetylphenylmethane, stearoyl-4-methoxybenzoylmethane, bis(4-tert-butylbenzoyl)methane, benzoylacetyl-ethylmethane, benzoyltrifluoroacetylmethane, diacetylmethane, butanoylacetylmethane, heptanoylacetylmethane, triacetylmethane, distearoylmethane, stearoylacetylmethane, palmitoylacetylmethane, lauroylacetylmethane, benzoylformylmethane, acetylformylmethane, benzoylphenylacetylmethane, bis (cyclohexanoyl)methane and dipivaloylmethane; and metal salts of these compounds with such metals as Li, Na, Mg, Ca, Ba, Sr, Zn, Al, Zr and Sn.

Specific example of nitrogen-containing heat stabilizers include diphenylthiourea; P-aminocrotonic acid esters of such alcohols as stearyl alcohol, cetyl alcohol, 1,3-butanediol and thiodiethylene glycol; and 2-phenylindole and dihydro-1,4-dimethyl-2,6-dicarboxyl-oxy-3,5-pyridine.

Use rate of those heat stabilizers ranges 0.01–10% by weight, preferably 0.05–5% by weight, to the thermoplastic resin. They can be used either singly or in combination of two or more.

Flourescent agents may also be added to the agricultural film of the present invention.

As the fluorescent agents, those of violanthrone, isoviolanthrone, perylene, thioxanthene, coumarin, anthraquinone, benzopyran, naphthalimide, or naphthalic acid, benzopiperidine, pyrazine, cyanopyrazine, stilbene, diaminodiphenyl, imidazole, imidazolone, triazole, thiazole, oxazole, carbostyril, pyrazoline and dihydropyridine compounds can be named.

Use rate of such flourescent agents ranges 0.001–10% by weight, preferably 0.01–5% by weight, to the thermoplastic resin. They can be used either singly or in combination of two or more.

Finally, as examples of other infrared absorbing agents, silica and silicate; hydroxide, oxide, aluminate, borate and sulfate of lithium, calcium, magnesium and aluminium; and ordinary hydrotalicite compounds may be named. They can be used either singly or in combination of two or more.

The heat insulators according to the present invention are synthetic chalcoalumite compounds having an average secondary particle diameter of not more than about 3 μm and a BET specific surface area of not more than about 30 m$^2$/g and/or their surface treated products, which are if necessary used concurrently with those various additives to be added to the thermoplastic resin. For example, per 100 parts by weight of the thermoplastic resin, 1–30 parts by weight of a synthetic chalcoalumite compound of the invention having an average secondary particle diameter of not more than about 3 μm and a BET specific surface area of not more than about 30 m$^2$/g as a heat insulator is added, either by itself or as the total sum with other heat insulator. Furthermore, 0.01–5 parts by weight of photostabilizer and antihazing agent per 100 parts by weight of the resin and optionally other additives also are blended. When the use rate of the heat insulator or insulators is less than one part by weight, sufficient heat insulating effect cannot be exhibited. Whereas, when it exceeds 30 parts by weight, visible light transmission and mechanical strength of the agricultural film are objectionably impaired.

The synthetic chalcoalumite compounds of the present invention can be removed of their water of crystallization (mH$_2$O) partially or totally, by a heat treatment at 150–280° C. for 0.5–20 hours. So treated chalcoalumite can be used, if desired, to avoid such problems as foaming of the resin composition.

Kneading of the chalcoalumite compound of the present invention into thermoplastic resin can be effected by any of conventionally practiced methods. For example, the resin and heat insulator are mixed with a Henschel mixer, super mixer, ribbon blender and the like, and then melted and kneaded in a Bumbury's mixer, kneading extruder, pressure kneader or the like. The kneaded product then can be formed into film by conventional molding methodes such as, for example, inflation molding or extrusion T-die film-forming method.

The agricultural film of the present invention can be either monolayered or multilayered. As the construction of the multilayered film, for example, single composition-2 layers, single composition-3 layers, 2 compositions-2 layers, 2 compositions-3 layers, 3 compositions-3 layers, 3 compositions-4 layers, 3 compositions-5 layers, 4 compositions-4 layers, 4 compositions-5 layers, 5 compositions-5 layers can be used. Kind of thermoplastic resin or resin blend may be different among individual layers. Of useful thermoplastic resins, it is desirable to select at least one resin which shows favorable absorption at the wavelength region of 2.5 μm–25 μm, because of good heat insulation. Again, additives for individual layers can be suitably selected according to the intended functions thereof, to formulate the optimum blend for each layer. It is also possible to form an antihazing film on at least the inner surface of the agricultural film which is to be stretched over agricultural greenhouses or the like for the purpose of maintaining anti-hazing performance of the film over many hours, besides the earlier described method of blending an antihazing agent in the film.

Hereinafter the heat insulator and agricultural film of the present invention are explained, referring to Examples and Comparative Examples.

Those synthetic chalcoalumite compounds in the following Examples and Comparative Examples were identified by means of powder X-ray diffraction (XRD). Specific surface areas are given by the numerical values determined by BET process for the adsorbed amounts of nitrogen gas. The secondary particle diameters are the numerical values obtained by adding each powder to an organic solvent, subjecting the system to an ultrasonic dispersion and then measuring the particle diameters by laser diffractive scattering method, and the refractive indices were measured with Abbe's refractometer.

The films containing heat insulators in the Examples and Comparative Examples were measured of dispersibility of the heat insulators in the films, mechanical strength, heat insulation index, total light transmission and haze value (degree of haziness). The dispersibility of a heat insulator in a film (formation of white blister) was evaluated by visual observation; mechanical strength is indicated by strength and elongation values measured of dumbbell-formed samples punched out of the film. The heat insulation indices were calculated by a method described later, from the measurements of infrared absorption at individual wavelengths using infrared absorption spectrum measuring device. Also photo-transmission of each heat insulator in each film was measured with hazemeter, and the result was expressed as total light transmission and haze value (degree of haziness).

The heat insulation index was calculated as follows. The black body radiation energy (Eλ) at each wavelength was determined by the equation (2) below, and the total black body radiation energy density by integrating the black body radiation energy levels from 400 cm$^{-1}$ to 2,000$^{-1}$ (ΣEλdλ). Then infrared absorption of each film (containing the heat insulator) at each wavelength was measured with infrared absorption spectrum-measuring device, and by multiplying the black body radiation energy (Eλ) at each wavelength by the infrared absorption at the same wavelength and integrating the products, total absorption energy density of the film was determined. The ratio of the total black body radiation energy density to the total absorption energy density of the film [equation (3)] is shown as the heat insulation index.

$$E\lambda = 2\pi h C^2 / [\lambda^5 \{e^{(hc/\lambda kT)} - 1\}] \quad (2)$$

λ: wavelength,
h: Planck's constant
C: velocity of light in vacuum,
k: Boltzmann's constant
T: absolute temperature Heat isulation index = (total absorption energy density/ total black body radiation energy density) × 100     (3)

A higher heat insulation index as calculated from the above equation signifies greater infrared absorbability, i.e., higher heat insulation property. Also the closer the total light transmission to 100 as measured by hazemeter, the better the visible light transmission of the film, and the less the haze value (degree of haziness), the less the haziness in the film.

EXAMPLE 1

14.52 Grams of first class grade zinc sulfate (ZnSO$_4$. 7H$_2$O, content 99%) and 97 ml of aqueous aluminum sulfate solution (concentration: 1.03 mol/liter) were dissolved in deionized water and the total amount was adjusted to 500 ml. The solution was put in a 1-liter beaker, and into which 162 ml of 3.4N NaOH solution of first class grade was added at room temperature, under vigorous agitation with a mixer, followed by about 30 minutes' stirring. Thus obtained coprecipitate was filtered, washed with water, and suspended in 0.05 mol/liter ZnSO$_4$ solution, the total amount of the suspension being adjusted to 700 ml. The suspension was then transferred into an autoclave of 0.98 liter in capacity and subjected to a hydrothermal reaction at 150° C. for 4 hours, followed by filtration under reduced pressure, aqueous washing and drying at 85° C. for 24 hours. The dry cake was then pulverized and sieved through a 100-mesh sieve.

The composition of the above product determined by chemical analysis was as follows.

$$Zn_{0.99}Al_4(OH)_{11.94}(SO_4)_{1.02} \cdot 3.3H_2O$$

The product was identified to be a chalcoalumite compound by powder X-ray diffraction analysis (XRD) measurement and chemical analysis. Its BET specific surface area was 17.2 m$^2$/g, the average secondary particle diameter was 0.70 μm and the refractive index was 1.51–1.53.

EXAMPLE 2

Twenty (20) g of disodium hydrogenphosphate (Na$_2$HPO$_4$. 12H$_2$O) of first class grade was dissolved in deionized water, and the total volume of the solution was adjusted to 600 ml. The solution was put in a 1-liter beaker and maintained at a temperature of 35° C. While stirring the solution with homogenizer, 23 g of the synthetic chalcoalumite compound obtained by the process same as Example 1 was added thereto and was reacted at 35° C. for 30 minutes. The product then was filtered, washed with water and dried at 85° C. for 24 hours. The dry product was pulverized and sieved with a 100-mesh sieve.

The composition of the product determined by chemical analysis was as follows.

$$Zn_{0.99}Al_4(OH)_{12.08}(SO_4)_{0.65}(HPO_4)_{0.30} \cdot 2.6H_2O$$

The product was identified to be a chalcoalumite compound by powder X-ray diffraction (XRD) measurement and chemical analysis. Its BET specific surface area was 18.5 m$^2$/g, average secondary particle diameter was 0.51 μm and refractive index was 1.51–1.53.

EXAMPLE 3

A synthetic chalcoalumite compound suspension which was obtained through the operations similar to Example 1 and underwent the hydrothermal reaction was filtered, washed with water and then with 400 ml of Na$_2$CO$_3$ solution of 0.1 mol/liter concentration, followed by another aqueous washing. Then the washed cake and deionized water were put in a 1-liter vessel, thoroughly dispersed with an agitator to form a suspension, and heated to 80° C. Separately, 0.97 g of sodium stearate (content 86%) and 150 ml of deionized water were put in a 200-ml beaker, and the sodium stearate was dissolved under heating to about 80° C. The solution was poured into the suspension under stirring and kept at 80° C. for 30 minutes. Thereafter the system was filtered under reduced pressure, washed with water and dried at 85° C. for 24 hours. The dry product was pulverized and sieved with a 100-mesh sieve.

The composition of the product determined by chemical analysis was as follows.

$$Zn_{0.95}A_4(OH)_{12.08}(SO_4)_{0.89} \cdot 3.2H_2O$$

The product was identified to be a chalcoalumite compound by powder X-ray diffraction (XRD) measurement and chemical analysis. Its BET specific surface area was 13.1 m$^2$/g, average secondary particle diameter was 0.74 μm and the refractive index was 1.51–1.53.

EXAMPLE 4

6.27 Grams of copper sulfate (CuSO$_4$. 5H$_2$O, content 99.5%) of the special class grade, zinc sulfate (ZnSO$_4$. 7H$_2$O, content 99%) of the first class grade and 97 ml of aqueous aluminum sulfate solution (concentration: 1.03 mol/liter) were dissolved in deionized water and the total amount was adjusted to 500 ml. The solution was put in a 1-liter beaker, and into which 171 ml of 3.4N NaOH solution of the first class grade was poured at room temperature, under vigorous agitation with a homo mixer, followed by about 30 minutes' stirring. Thus obtained coprecipitate was filtered, washed with water, and suspended in a mixture of 0.025 mol/liter ZnSO$_4$ solution and 0.025 mol/liter CuSO$_4$ solution, the total amount of the suspension being adjusted to 700 ml. The suspension was then transferred into an autoclave of 0.98 liter in capacity and subjected to a hydrothermal reaction at 140° C. for 4 hours, followed by filtration and aqueous washing. The filter cake was further washed with 400 ml of 0.1 mol/liter Na$_2$CO$_3$ solution, then with water once again, and put in a 1-liter vessel together with deionized water, followed by thorough dispersion with an agitator. The resultant suspension was heated to 80° C. Separately, 2.00 g of sodium stearate (content 86%) and 150 ml of deionized water were put in a 200-ml beaker and the sodium stearate was dissolved under heating at about 80° C. This solution was poured into the suspension under stirring and maintained at 80° C. for 30 minutes, followed by filtration under reduced pressure, aqueous washing and drying at 85° C. for 24 hours. The dry cake was then pulverized and sieved through a 100-mesh sieve.

The composition of the above product determined by chemical analysis was as follows.

$$(Zn_{0.45}Cu_{0.42})Al_4(OH)_{11.94}(SO_4)_{0.90} \cdot 3.2H_2O$$

The product was identified to be a chalcoalumite compound by powder X-ray diffraction analysis (XRD) measurement and chemical analysis. Its BET specific surface area was 12.1 m$^2$/g, the average secondary particle diameter was 0.87 μm and the refractive index was 1.51–1.53.

EXAMPLE 5

7.26 Grams of the first class grade zinc sulfate (ZnSO$_4$.7H$_2$O, content 99%), 6.0 g of the special class grade nickel chloride (NiCl$_2$.6H$_2$O, content 99%) and 97 ml of aqueous aluminum sulfate solution (concentration: 0.3 mol/liter) were dissolved in deionized water and the total amount was adjusted to 500 ml. The solution was put in a 1-liter beaker, and into which 171 ml of 3.4N NaOH solution of first class grade was added at room temperature, under vigorous agitation with an agitator, followed by about 30 minutes' stirring. Thus obtained coprecipitate was filtered, washed with water, and suspended in a mixture of 0.025 mol/liter zinc sulfate and 0.025 mol/liter nickel sulfate solutions the total amount of the suspension being adjusted to 700 ml. The suspension was then transferred into an autoclave of 0.98 liter in capacity and subjected to a hydrothermal reaction at 140° C. for 4 hours, followed by filtration and aqueous washing. The filter cake was further washed with 400 ml of 0.1 mol/liter Na$_2$CO$_3$ solution, then with water again and put in a 1-liter vessel together with deionized water, followed by thorough dispersion with an agitator. The resultant suspension was heated to 80° C. Separately, 1.90 g of sodium stearate (content 86%) and 150 ml of deionized water were put in a 200-ml beaker and the sodium stearate was dissolved under heating to about 80° C. This solution was poured into the suspension under stirring and maintained at 80° C. for 30 minutes, followed by filtration under reduced pressure, aqueous washing and drying at 85° C. for 24 hours. The dry cake was then pulverized and sieved through a 100-mesh sieve.

The composition of the above product determined by chemical analysis was as follows.

$$(Zn_{0.47}Ni_{0.43})Al_4(OH)_{11.98}(SO_4)_{0.91} \cdot 2.9H_2O$$

The product was identified to be a chalcoalumite compound by powder X-ray diffraction analysis (XRD) measurement and chemical analysis. Its BET specific surface area was 25 m$^2$/g, the average secondary particle diameter was 1.8 μm and the refractive index was 1.51–1.53.

EXAMPLE 6

12.55 Grams of the special class grade copper sulfate (CuSO$_4$.5H$_2$O, content 99.5%) and 97 ml of aqueous aluminium sulfate solution (concentration: 1.03 mol/liter) were dissolved in deionized water and the total amount was adjusted to 500 ml. The solution was put in a 1-liter beaker, and into which 166 ml of 3.4N NaOH solution of the first class grade was added at room temperature, under vigorous agitation with an agitator, followed by about 30 minutes' stirring. Thus obtained coprecipitate was filtered, washed with water, and suspended in 0.05 mol/liter CuSO$^4$ solution, the total amount of the suspension being adjusted to 700 ml. The suspension was then transferred into an autoclave of 0.98 liter in capacity and subjected to a hydrothermal reaction at 140° C. for 4 hours, followed by filtration and aqueous washing. The filter cake was further washed with 400 ml of 0.1 mol/liter Na$_2$CO$_3$ solution, then with water again and put in a 1-liter vessel together with deionized water, followed by thorough dispersion with an agitator. The resultant suspension was heated to 80° C. Separately, 1.80 g of sodium stearate (content 86%) and 150 ml of deionized water were put in a 200-ml beaker and the sodium stearate was dissolved under heating to about 80° C. This solution was poured into the suspension under stirring and maintained at 80° C. for 30 minutes, followed by filtration under reduced pressure, aqueous washing and drying at 85° C. for 24 hours. The dry cake was then pulverized and sieved through a 100 -mesh sieve.

The composition of the above product determined by chemical analysis was as follows.

$$Cu_{1.01}Al_4(OH)_{12.40}(SO_4)_{0.80} \cdot 3.1H_2O$$

The product was identified to be a chalcoalumite compound by powder X-ray diffraction analysis (XRD) measurement and chemical analysis. Its BET specific surface area was 18 m$^2$/g, the average secondary particle diameter was 0.77 μm and the refractive index was 1.51–1.53.

Comparative Example 1

The coprecipitate obtained through the reaction identical with that in Example 1 was subjected to a hydrothermal reaction as it was. The conditions of the hydrothermal reaction and subsequent operations were same to those of Example 1.

The composition of the product determined by chemical analysis was as follows.

$$Zn_{0.98}Al_4(OH)_{11.32}(SO_4)_{1.02}\cdot 3.5H_2O$$

The product was identified to be a chalcoalumite compound by powder X-ray diffraction analysis (XRD) measurement and chemical analysis. Its BET specific surface area was 32 m²/g, the average secondary particle diameter was 4.2 μm and the refractive index was 1.51–1.53.

Comparative Example 2

The coprecipitate obtained through the reaction identical with that in Example 1 was filtered, washed with water, then suspended in water and subjected to a hydrothermal reaction. The conditions of the hydrothermal reaction and subsequent operations were same to those of Example 1.

The composition of the above product determined by chemical analysis was as follows.

$$Zn_{0.73}Al_4(OH)_{11.72}(SO_4)_{0.87}\cdot 2.7H_2O$$

The product was identified to be a chalcoalumite compound by powder X-ray diffraction analysis (XRD) measurement and chemical analysis. Its BET specific surface area was 35 m²/g, the average secondary particle diameter was 5.4 μm and the refractive index was 1.51–1.53.

Comparative Example 3

The coprecipitate obtained through the reaction identical with that in Example 1 was filtered, washed with water, suspended in aqueous zinc nitrate solution (concentration: 0.05 mol/liter) and was subjected to a hydrothermal reaction. The conditions of the hydrothermal reaction and subsequent operations were same to those of Example 1.

The composition of the product determined by chemical analysis was as follows.

$$Zn_{0.92}Al_4(OH)_{11.40}(SO_4)_{0.95}\cdot 3.2H_2O$$

The product was identified to be a chalcoalumite compound by powder X-ray diffraction analysis (XRD) measurement and chemical analysis. Its BET specific surface area was 31 m²/g, the average secondary particle diameter was 3.6 μm and the refractive index was 1.51–1.53.

Comparative Example 4

The synthetic chalcoalumite compound suspension after the hydrothermal reaction, which had been obtained through same procedures to those of Comparative Example 1 was filtered, washed with water and then with 400 ml of aqueous Na₂CO₃ solution (concentration: 0.1 mol/liter), followed by another aqueous washing. The washed cake was put in a 1-liter beaker together with deionized water and thoroughly dispersed with an agitator. The resultant suspension was heated to 80° C. Separately, 2.88 g of sodium stearate (content 86%) and 150 ml of deionized water were put in a 200-ml beaker and the sodium stearate was dissolved under heating to about 80° C. This solution was poured into the suspension under stirring and maintained at 80° C. for 30 minutes, followed by filtration under reduced pressure, aqueous washing and drying at 85° C. for 24 hours. The dry cake was then pulverized and sieved through a 100-mesh sieve.

The composition of the above product determined by chemical analysis was as follows.

$$Zn_{0.73}Al_4(OH)_{11.86}(SO_4)_{0.80}\cdot 2.5H_2O$$

The product was identified to be a chalcoalumite compound by powder X-ray diffraction analysis (XRD) measurement and chemical analysis. Its BET specific surface area was 31 m²/g, the average secondary particle diameter was 5.1 μm and the refractive index was 1.51–1.53.

Comparative Example 5

The coprecipitate obtained through the reaction identical with that in Example 4 was subjected to a hydrothermal reaction as it was. The conditions of the hydrothermal reaction and subsequent operations were same to those of Example 4, except that 2.9 g of sodium stearate was used.

The chemical composition of the product determined by chemical analysis was as follows.

$$(Zn_{0.40}Cu_{0.41})Al_4(OH)_{11.82}(SO_4)_{0.90}\cdot 3.1H_2O$$

The product was identified to be a chalcoalumite compound by powder X-ray diffraction analysis (XRD) measurement and chemical analysis. Its BET specific surface area was 31 m²/g, the average secondary particle diameter was 5.3 μm and the refractive index was 1.51–1.53.

Comparative Example 6

The coprecipitate obtained through the reaction identical with that in Example 5 was subjected to a hydrothermal reaction as it was. The conditions of the hydrothermal reaction and subsequent operations were same to those of Example 4, except that 2.9 g of sodium stearate was used.

The composition of the above product determined by chemical analysis was as follows.

$$(Zn_{0.46}Ni_{0.42})Al_4(OH)_{11.98}(SO_4)_{0.90}\cdot 2.8H_2O$$

The product was identified to be a chalcoalumite compound by powder X-ray diffraction analysis (XRD) measurement and chemical analysis. Its BET specific surface area was 35 m²/g, the average secondary particle diameter was 5.0 μm and the refractive index was 1.51–1.53.

Comparative Example 7

The coprecipitate obtained through the reaction identical with that in Example 6 was subjected to a hydrothermal reaction as it was. The conditions of the hydrothermal reaction and subsequent operations were same to those of Example 4, except that 2.9 g of sodium stearate was used.

The composition of the above product determined by chemical analysis was as follows.

$$Cu_{0.98}Al_4(OH)_{12.36}(SO_4)_{0.80}\cdot 2.9H_2O$$

The product was identified to be a chalcoalumite compound by powder X-ray diffraction analysis (XRD) measurement and chemical analysis. Its BET specific surface area was 32 m²/g, the average secondary particle diameter was 3.9 μm and the refractive index was 1.51–1.53.

Effect Exhibited by the Agricultural Film

EVA (product of Nippon Unicar Co.,: VA content: 15%) was blended with below-identified components to form an EVA-based resin composition. The EVA-based resin composition was kneaded with the heat insulators produced in the foregoing Examples and Comparative Examples with a monoaxial kneader and extruded through a T-die extruder to 100 μm-thick films. First, dispersibility of each of the heat insulators in the film (formation of white blisters) was evaluated by visual observation. Then dumbbell-formed samples were punched out of the films, which were measured of mechanical strength, and their total light transmission and haze value (degree of haziness) were measured with hazemeter. Also the films' infrared absorbing ability was measured for calculating the heat insulation index.

| (EVA-based resin composition) | |
|---|---|
| Ethylene vinyl acetate copolymer (vinyl acetate content: 15%, 3758: Nippon Unicar Co.) | 100 wt parts |
| Hindered amine light stabilizer (CHIASSORB 770: Ciba Geigy) | 0.2 wt part |
| Ultraviolet absorber (TINUVIN 320: Ciba Geigy) | 0.1 wt part |
| Antioxidant (IRGANOX 1076: Ciba Geity) | 0.1 wt part |
| Antihazing agent | |
| monoglycerine monostearate | 1.5 wt part |
| diglycerine distearate | 0.5 wt part |
| Lubricant (stearic acid amide) | 0.1 wt part |
| Antifogging agent (DS-403 Daikin Kogyo) | 0.1 wt part |

EXAMPLE 7

To the EVA-based resin composition, 5% by weight of the powder produced in Example 1 was blended and shaped into a film.

EXAMPLE 8

To the EVA-based resin composition, 5% by weight of the powder produced in Example 2 was blended and shaped into a film.

EXAMPLE 9

To the EVA-based resin composition, 5% by weight of the powder produced in Example 3 was blended and shaped into a film.

EXAMPLE 10

To the EVA-based resin composition, 5% by weight of the powder produced in Example 4 was blended and shaped into a film.

EXAMPLE 11

To the EVA-based resin composition, 5% by weight of the powder produced in Example 5 was blended and shaped into a film.

EXAMPLE 12

To the EVA-based resin composition, 5% by weight of the powder produced in Example 6 was blended and shaped into a film.

EXAMPLE 13

To EVA-based resin composition, 5% by weight of the powder produced in Example 3, which was further fired at 200° C. for 3 hours and mol ratio of interlayer water was made 0.02 was blended and shaped into a film.

Comparative Example 8

To the EVA-based resin composition, 5% by weight of the powder produced in Comparative Example 1 was blended and shaped into a film.

Comparative Example 9

To the EVA-based resin composition, 5% by weight of the powder produced in Comparative Example 2 was blended and shaped into a film.

Comparative Example 10

To the EVA-based resin composition, 5% by weight of the powder produced in Comparative Example 3 was blended and shaped into a film.

Comparative Example 11

To the EVA-based resin composition, 5% by weight of the powder produced in Comparative Example 4 was blended and shaped into a film.

Comparative Example 12

To the EVA-based resin composition, 5% by weight of the powder produced in Comparative Example 5 was blended and shaped into a film.

Comparative Example 13

To the EVA-based resin composition, 5% by weight of the powder produced in Comparative Example 6 was blended and shaped into a film.

Comparative Example 14

To the EVA-based resin composition, 5% by weight of the powder produced in Comparative Example 7 was blended and shaped into a film.

Comparative Example 15

A film was prepared from the EVA-based resin composition without adding any heat insulator.

Results of evaluation of the films prepared in Examples 7–13 and Comparative Examples 8–15 are shown in Table 2.

TABLE 2

|  | Example 7 | Example 8 | Example 9 | Example 10 | Example 11 | Example 12 | Example 13 |
|---|---|---|---|---|---|---|---|
| dispersibility (visual observation)*1 | ○ | ○ | ○ | ○ | ○ | ○ | ○ |
| tensile strength (kg/mm$^2$) | 3.2 | 3.1 | 3.1 | 3.2 | 3.0 | 3.1 | 3.1 |
| tensile elongation (%) | 490 | 510 | 500 | 500 | 490 | 510 | 510 |
| heat insulation index | 75 | 75 | 74 | 74 | 75 | 73 | 74 |
| total light transmission (%) | 91 | 91 | 91 | 90 | 90 | 90 | 90 |
| haze value (degree of haziness) | 3 | 3 | 3 | 3 | 3 | 3 | 3 |

|  | Comparative Example 8 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|
| dispersibility (visual observation)*1 | X | X | X | X | X | X | X | — |
| tensile strength (kg/mm$^2$) | 1.7 | 1.9 | 1.8 | 2.0 | 1.7 | 1.8 | 2.1 | 3.3 |
| tensile elongation (%) | 330 | 350 | 340 | 360 | 320 | 370 | 380 | 480 |
| heat insulation index | 67 | 66 | 65 | 66 | 65 | 65 | 67 | 43 |
| total light transmission (%) | 87 | 86 | 86 | 87 | 86 | 86 | 85 | 92 |
| haze value (degree of haziness) | 6 | 7 | 6 | 7 | 7 | 7 | 6 | 1 |

*1dispersibility (formation of white blisters)
X poor(white blisters observed)
○ good (no white blister observed)

Metallocene PE (Nippon Polychem) was used in the following blend which served as the metallocene PE-based resin composition. The composition was blended with each heat insulators which were prepared in the foregoing Examples or Comparative Examples, kneaded with 140° C. open roll and shaped into 100 μm-thick film with 180° C. electric hot-pressing machine. The films were given the evaluations similar to those given to EVA-based films.

| [Metallocene PE-based resin composition] | |
|---|---|
| Metallocene PE (KF-270: Nippon Polychem Co.) | 100 wt parts |
| Hindered amine light stabilizer (TINUVIN 622: Ciba Geigy) | 0.2 wt part |
| Ultraviolet absorber (TINUVIN 320: Ciba Geigy) | 0.1 wt part |
| Antioxidant (IRGANOX 1010: Ciba Geigy) | 0.1 wt part |
| (IRGAFOS 168: Ciba Geigy) | 0.1 wt part |
| Antihazing agent | |
| monoglycerine monostearate | 1.5 wt part |
| diglycerine distearate | 0.5 wt part |
| Lubricant stearic acid amide | 0.1 wt part |
| Antifogging agent (KF-345, Shin-etsu Chemical Co.) | 0.1 wt part |

EXAMPLE 14

To the metallocene PE-based resin composition, 10% by weight of the powder produced in Example 3 was blended and shaped into a film.

EXAMPLE 15

To the metallocene PE-based resin composition, 10% by weight of the powder produced in Example 4 was blended and shaped into a film.

EXAMPLE 16

To the metallocene PE-based resin composition, 10% by weight of the powder produced in Example 6 was blended and shaped into a film.

Comparative Example 16

To the metallocene PE-based resin composition, 10% by weight of the powder produced in Comparative Example 4 was blended and shaped into a film.

Comparative Example 17

To the metallocene PE-based resin composition, 10% by weight of the powder produced in Comparative Example 5 was blended and shaped into a film.

Comparative Example 18

A film was prepared from the metallocene PE-based resin composition without adding any heat insulator.

Results of evaluation of the films prepared in Examples 14–16 and Comparative Examples 16–18 are shown in Table 3.

TABLE 3

|  | Example 14 | Example 15 | Example 16 | Comparative Example 16 | Comparative Example 17 | Comparative Example 18 |
|---|---|---|---|---|---|---|
| dispersibility (Visual observation)*1 | ○ | ○ | ○ | X | X | — |
| tensile strength (kg/mm²) | 3.9 | 3.8 | 3.8 | 2.0 | 1.9 | 4.4 |
| tensile elongation (%) | 510 | 490 | 500 | 290 | 300 | 600 |
| heat insulation index | 70 | 70 | 69 | 65 | 65 | 28 |
| total light transmission (%) | 91 | 91 | 91 | 88 | 87 | 92 |
| haze value (degree of haziness) | 4 | 4 | 4 | 7 | 7 | 2 |

*1 dispersibility (formation of white blisters)
○ good (no white blister observed)
X poor (white blisters observed)

According to the results indicated in those Tables, when synthetic chalcoalumite compounds whose average secondary particle diameter was more than about 3μ and BET specific surface area was more than about 30 m²/g were used as in Comparative Examples, they exhibited poor dispersibility in the films and caused formation of white blisters. The films had reduced mechanical strength and elongation, heat insulation property and visible light transmission (total light transmission and haze). By contrast, when those synthetic chalcoalumite compound having an average secondary particle diameter of not more than about 3 μm and a BET specific surface area not more than about 30 m²/g, and/or surface-treated products of such chalcoalumite compounds were used as in Examples of the present invention, no white blister was formed in the films, and thus films excelling in mechanical strength, elongation, heat insulation property and visible light transmission were obtained.

Figure 1:
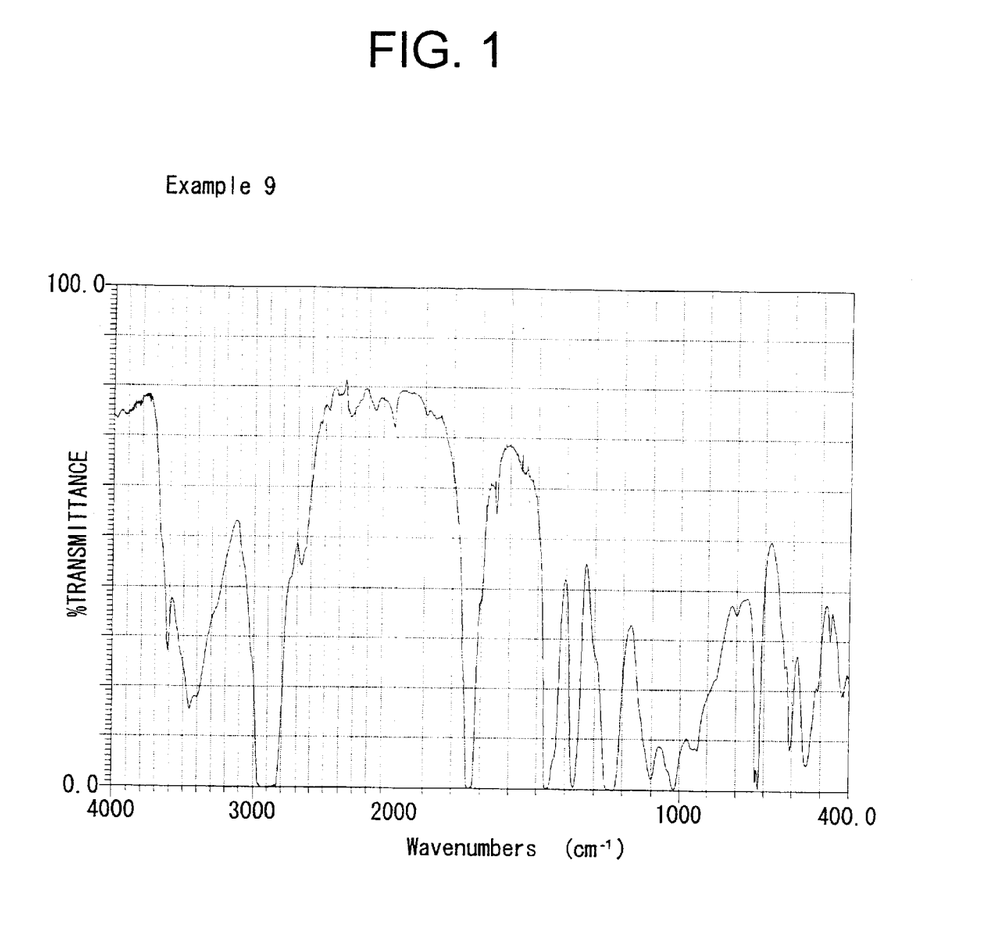
FIG. 1 is an infrared absorption spectrum of the film obtained in Example 9, which contained the synthetic chalcoalumite compound of Example 3.
Figure 2:
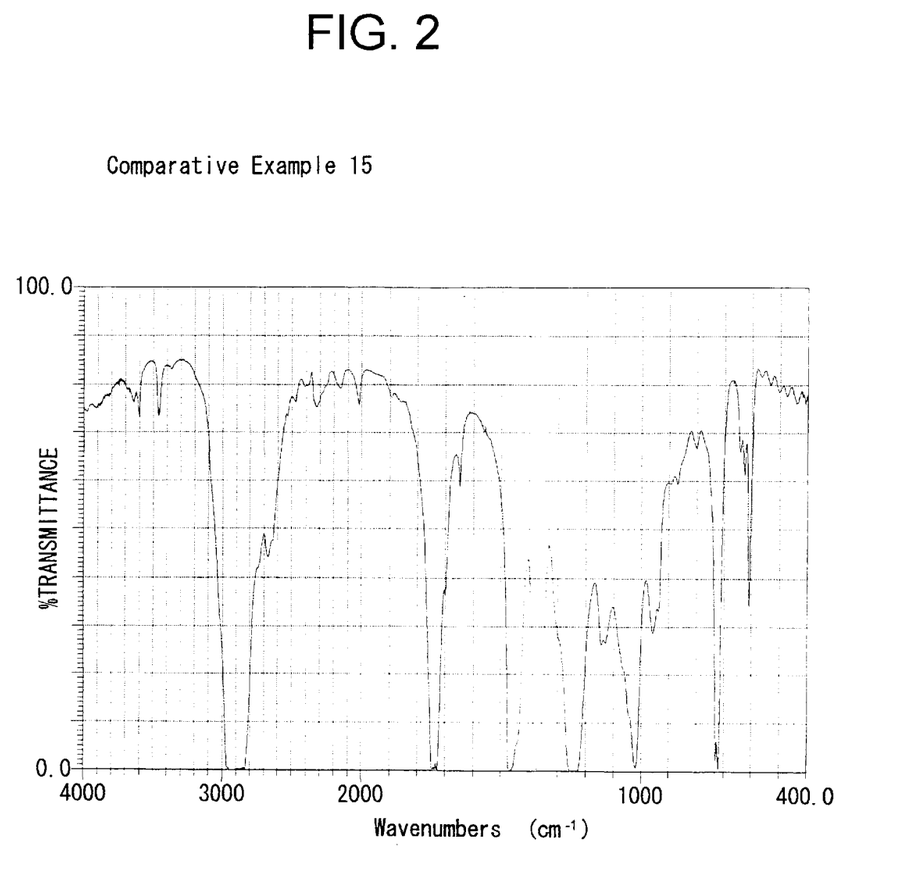
FIG. 2 is an infrared absorption spectrum of the film obtained in Comparative Example 15, which contained no heat insulator.

Infrared absorption charts of the EVA film (Example 9) containing a synthetic chalcoalumite compound of the present invention and that (Comparative Example 15) containing no heat insulator are shown in FIG. 1 and FIG. 2, respectively. The charts demonstrate that the EVA film containing the synthetic chalcoalumite compound (Example 9) showed increased infrared absorbing ability over a broad range. In particular, within the wavelength region of 400–1200 cm$^{-1}$ the film showed low transmission and hence it can be understood that it had been given an increased infrared absorption ability within said wavelength region and in consequence an improved heat insulation property.

Effect of the Invention

By the use of a synthetic chalcoalumite compound having an average secondary particle diameter of not more than about 3 μm and a BET specific surface area of not more than about 30 m²/g and/or its surface-treated product of the present invention as a heat insulator in agricultural film, agricultural film in which dispersibility of the heat insulator is excellent, and which exhibits very favorable mechanical properties and ultraviolet and visible light transmission and excellent infrared absorption over the broad infrared region from about 2.5 to 25 μm can be provided. Furthermore, by concurrent use of various additives, agricultural film excelling in weatherability, anti-hazing property, anti-fogging property, dust resistance, water repellence, toughness, agricultural chemical resistance, acid precipitation, heat resistance, antibacterial property, antimold property, spreading processability and prevention of resin degradation caused by the various additives, and furthermore excelling in durability of those favorable properties can be provided.

What is claimed is:

1. A synthetic chalcoalumite compound represented by formula (1) below:

$$(M_1^{2+})_{a-x}(M_2^{2+})_x Al^{3+}_4 (OH)_b (A^{n-})_c \cdot mH_2O \quad (1)$$

in which $M_1^{2+}$ stands for $Zn^{2+}$ or $Cu^{2+}$, $M_2^{2+}$ is at least one divalent metal ion selected from $Ni_{2+}$, $Co_{2+}$, $Cu_{2+}$, Zn2+ and $Mg^{2+}$, a is 0.3<a<2.0, with the proviso that $M_1$ and $M_2$ are not the same, x is 0≦x ≦1.0, and x<a, b is 10<b<14, $A^{n-}$ is at least one ion selected from $SO_4^{2-}$, $HPO_4^{2-}$, $CO_3^{2-}$, $SO_3^{2-}$, $HPO_3^{2-}$, $NO_3^-$, $H_2PO_4^-$, $Cl^-$, $OH^-$ and silicate ion, c is 0.4<c<2.0 and m is 0–4, which has an average secondary particle diameter of not more than about 3 μm and a BET specific surface area of not more than 30 m²/g.

2. A process for preparing a synthetic chalcoalumite compound as described in claim 1, which process comprises the steps of coprecipitating a water-soluble aluminium salt; a Zn and/or Cu compound which is water-soluble in the pH range of from about 4 to about 7; and if necessary one or more compounds of at least an element selected from Ni, Co and Mg which are water-soluble in the pH range of from about 4 to about 7, at a pH of from 4 to 7 and at temperatures ranging from about 10° to 50° C., filtering the coprecipitate and washing it with water; and then subjecting the washed product to hydrothermal reaction in an aqueous solution of sulfuric acid salt of at least one element selected from Zn, Cu, Ni and Co at a concentration of at least 0.02 mol/liter, at temperatures ranging from 80 to 170° C.

3. A process for preparing a synthetic chalcoalumite compound as described in claim 1, which process comprises the steps of coprecipitating a water-soluble aluminium salt; a Zn and/or Cu compound which is water-soluble in the pH range of from about 4 to about 7; and if necessary one or more compounds of at least an element selected from Ni, Co and Mg which are water-soluble in the pH range of from about 4 to about 7, at a ph of from 4 to 7 and at temperatures ranging from about 20 to 40° C., filtering the coprecipitate and washing it with water; and then subjecting the washed product to hydrothermal reaction in an aqueous solution of sulfuric acid salt of at least one element selected from zn, cu, ni and Co at a concentration ranging from about 0.02 to 1 mol/liter, at temperatures ranging from 100° to 150° C.

4. A heat insulating agent which is the synthetic chalcoalumite compound as described in claim 1, which is surface-treated with at least one member of the group consisting of higher fatty acids; anionic surfactants; phosphoric acid esters; silane-, titanate- and aluminum-containing coupling agents; and fatty acid esters of polyhydric alcohols.

5. A resin composition comprising:

100 parts by weight of a thermoplastic resin; and

1–30 parts by weight of a synthetic chalcoalumite compound represented by formula (1) below $$(M_1^{2+})_{a-x}(M_2^{2+})_x Al^{3+}{}_4(OH)_b(A^{n-})_c \cdot mH_2O \qquad (1)$$

in which $M_1^{2+}$ stands for $Zn^{2+}$ or $Cu_{2+}$, $M_2^{2+}$ is at least one divalent metal ion selected from $Ni_{2+}$, $Co_{2+}$, $Cu_{2+}$, $Zn^{2+}$ and $Mg^{2+}$, a is $0.3<a<2.0$, with the proviso that $M_1$ and $M_2$ are not the same, x is $0 \leq x \leq 1.0$, $x<a$, b is $10<b<14$, $A^{n-}$ is at least one ion selected from $SO_4^{2-}$, $HPO_4^{2-}$, $CO_3^{2-}$, $SO_3^{2-}$, $HPO_3^{2-}$, $NO_3^-$, $H_2PO_4^-$, $Cl^-$, $OH^-$ and silicate ion, c is $0.4<c<2.0$ and m is 0–4, which has an average secondary particle diameter of not more than about 3 μm and a BET specific surface area of not more than about 30 m²/g.

6. A resin composition comprising:

100 parts by weight of a thermoplastic resin; and

1–30 parts by weight of a heat insulating agent which is a synthetic chalcoalumite compound represented by formula (1) below $$(M_1^{2+})_{a-x}(M_2^{2+})_x Al^{3+}{}_4(OH)_b(A^{n-})_c \cdot mH_2O \qquad (1)$$

in which $M_1^{2+}$ stands for $Zn^{2+}$ or $Cu^{2+}$, $M_2^{2+}$ is at least one divalent metal ion selected from $Ni_{2+}$, $Co_{2+}$, $Cu_{2+}$, $Zn^{2+}$ and $Mg^{2+}$, a is $0.3<a<2.0$, with the proviso that $M_1$ and $M_2$ are not the same, x is $0 \leq x<1.0$, $x<a$, b is $10<b<14$, $A^{n-}$ is at least one ion selected from $SO_4^{2-}$, $HPO_4^{2-}$, $CO_3^{2-}$, $SO_3^{2-}$, $HPO_3^{2-}$, $NO_3^{2-}$, $H_2PO_4^-$, $Cl^-$, $OH^-$ and silicate ion, c is $0.4<c<2.0$ and m is 0–4, which has an average secondary particle diameter of not more than about 3 μm and a BET specific surface area of not more than about 30 m²/g, and which has been surface-treated with at least one member selected from the group consisting of higher fatty acids, anionic surfactants, phosphoric acid esters, silane-containing coupling agents, titanate-containing coupling agents, aluminum-containing coupling agents and fatty acid esters of polyhydric alcohols.

7. An agricultural film comprising a resin composition containing 100 parts by weight of a thermoplastic resin; and 1–30 parts by weight of a synthetic chalcoalumite compound represented by formula (1) below $$(M_1^{2+})_{a-x}(M_2^{2+})_x Al^{3+}{}_4(OH)_b(A^{n-})_c \cdot mH_2O \qquad (1)$$

in which $M_1^{2+}$ stands for $Zn^{2+}$ or $Cu_{2+}$, $M_2^{2+}$ is at least one divalent metal ion selected from $Ni^{2+}$, $Co_{2+}$, $Cu_{2+}$, $Zn^{2+}$ and $Mg^{2+}$, a is $0.3<a<2.0$, with the proviso that $M_1$ and $M_2$ are not the same, x is $0 \leq x \leq 1.0$, $x<a$, b is $10<b<14$, $A^{n-}$ is at least one ion selected from $SO_4^{2-}$, $HPO_4^{2-}$, $CO_3^{2-}$, $SO_3^{2-}$, $HPO_3^{2-}$, $NO_3^-$, $H_2PO_4^-$, $Cl^-$, $OH^-$ and silicate ion, c is $0.4<c<2.0$ and m is 0–4, which has an average secondary particle diameter of not more than about 3 μm and a BET specific surface area of not more than about 30 m²/g;

said resin composition having been formed into a film structure.

8. An agricultural film comprising a resin composition containing 100 parts by weight of a thermoplastic resin; and 1–30 parts by weight of a heat insulating agent which is a synthetic chalcoalumite compound represented by formula (1) below $$(M_1^{2+})_{a-x}(M_2^{\ 2+})_x Al^{3+}{}_4(OH)_b(A^{n-})_c \cdot mH_2O \qquad (1)$$

in which $M_1^{2+}$ stands for $Zn^{2+}$ or $Cu^{2+}$, $M_2^{2+}$ is at least one divalent metal ion selected from $Ni^{2+}$, $Co^{2+}$, $Cu^{2+}$, $Zn^{2+}$ and $Mg^{2+}$, a is $0.3<a<2.0$, with the proviso that $M_1$ and $M_2$ are not the same, x is $0 \leq x \leq 1.0$, $x<a$, b is $10<b<14$, $A^{n-}$ is at least one ion selected from $SO_4^{2-}$, $HPO_4^{2-}$, $CO_3^{2-}$, $SO_3^{2-}$, $HPO_3^{2-}$, $NO_3^-$, $H_2PO_4^-$, $Cl^-$, $OH^-$ and silicate ion, c is $0.4<c<2.0$ and m is 0–4, which has an average secondary particle diameter of not more than about 3 μm and a BET specific surface area of not more than about 30 m²/g, and which has been surface-treated with at least one member selected from the group consisting of higher fatty acids, anionic surfactants, phosphoric acid esters, silane-containing coupling agents, titanate-containing coupling agents, aluminum-containing coupling agents and fatty acid esters of polyhydric alcohols;

said resin composition having been formed into a film structure.

* * * * *